United States Patent
Trainer et al.

(10) Patent No.: US 8,854,843 B2
(45) Date of Patent: Oct. 7, 2014

(54) HVDC CONVERTER WITH NEUTRAL-POINT CONNECTED ZERO-SEQUENCE DUMP RESISTOR

(75) Inventors: David Reginald Trainer, Alvaston (GB); Nnamdi Okaeme, London (GB)

(73) Assignee: Alstom Technology Ltd., Baden (CH)

( * ) Notice: Subject to any disclaimer, the term of this patent is extended or adjusted under 35 U.S.C. 154(b) by 18 days.

(21) Appl. No.: 13/818,654

(22) PCT Filed: Aug. 24, 2010

(86) PCT No.: PCT/EP2010/062316
§ 371 (c)(1),
(2), (4) Date: Apr. 11, 2013

(87) PCT Pub. No.: WO2012/025142
PCT Pub. Date: Mar. 1, 2012

(65) Prior Publication Data

US 2014/0146583 A1    May 29, 2014

(51) Int. Cl.
*H02J 3/36* (2006.01)
*H02M 1/12* (2006.01)
*H02M 7/797* (2006.01)

(52) U.S. Cl.
CPC .. *H02J 3/36* (2013.01); *H02M 1/12* (2013.01); *H02M 7/797* (2013.01)
USPC .............................................. 363/35; 363/39

(58) Field of Classification Search
CPC ........... H02M 7/06; H02M 1/12; H02M 7/21; H02M 7/217; H02M 7/2176; H02M 2001/12; H02M 2007/217
USPC .................. 363/35, 39, 44, 65–68, 125–132; 323/205–208, 266
See application file for complete search history.

(56) References Cited

U.S. PATENT DOCUMENTS 4,053,820 A * 10/1977 Peterson et al. ................ 363/44

4,663,702 A * 5/1987 Tanaka ............................. 363/65

(Continued)

FOREIGN PATENT DOCUMENTS

DE    102007003172 A1    2/2008
DE    102008045247 A1    3/2010

(Continued)

OTHER PUBLICATIONS

International Search Report and the Written Opinion of the International Search Authority for Application No. PCT/EP2010/062316, mailed on Jul. 6, 2011.

(Continued)

*Primary Examiner* — Timothy J Dole
*Assistant Examiner* — Yusef Ahmed
(74) *Attorney, Agent, or Firm* — Nixon Peabody LLP

(57) ABSTRACT

A power electronic converter (30) is for use in high voltage direct current power transmission and reactive power compensation, the power electronic converter (30) including three phase elements (32) defining a star connection (36) and a converter unit (34) including first and second DC terminals (50,52) for connection in use to a DC network (56) and three AC terminals (54), the converter unit (34) including a plurality of switching elements (70,74) controllable in use to facilitate power conversion between the AC and DC networks (44,56), the power electronic converter (30) further including a third DC terminal (78) connected between the first and second DC terminals (50,52), the third DC terminal (78) being connected to a common junction (40) of the star connection (36) to define an auxiliary connection (82), the auxiliary connection (82) including at least one dump resistor (84) connected between the common junction (40) and the third DC terminal (78), wherein the switching elements (70, 74) of the converter unit (34) are controllable in use to modify a phase voltage at each AC terminal (54) to include a triplen harmonic voltage component so as to dissipate real power in the or each dump resistor (84) at a triplen harmonic frequency.

14 Claims, 5 Drawing Sheets

(56) References Cited

U.S. PATENT DOCUMENTS

| | | | |
|---|---|---|---|
| 4,816,736 A * | 3/1989 | Dougherty et al. | 320/116 |
| 5,093,583 A * | 3/1992 | Mashino et al. | 307/10.1 |
| 5,345,375 A * | 9/1994 | Mohan | 363/40 |
| 5,499,178 A * | 3/1996 | Mohan | 363/39 |
| 5,515,264 A * | 5/1996 | Stacey | 363/132 |
| 5,719,486 A * | 2/1998 | Taniguchi et al. | 322/28 |
| 5,726,557 A * | 3/1998 | Umeda et al. | 322/21 |
| 5,889,667 A * | 3/1999 | Bernet | 363/127 |
| 5,892,677 A * | 4/1999 | Chang | 363/152 |
| 5,936,855 A | 8/1999 | Salmon | |
| 6,134,126 A * | 10/2000 | Ikekame et al. | 363/39 |
| 6,236,580 B1 * | 5/2001 | Aiello et al. | 363/37 |
| 6,301,130 B1 * | 10/2001 | Aiello et al. | 363/37 |
| 6,320,767 B1 * | 11/2001 | Shimoura et al. | 363/37 |
| 6,392,348 B1 * | 5/2002 | Dougherty | 315/82 |
| 6,987,680 B2 | 1/2006 | Vire et al. | |
| 7,170,767 B2 | 1/2007 | Bixel | |
| 7,274,576 B1 | 9/2007 | Zargari et al. | |
| 7,298,115 B2 * | 11/2007 | Nishimura et al. | 322/28 |
| 7,622,825 B2 | 11/2009 | Brune et al. | |
| 8,188,720 B2 | 5/2012 | Kim et al. | |
| 2003/0202367 A1 * | 10/2003 | Schreiber | 363/72 |
| 2005/0135126 A1 * | 6/2005 | Gazel et al. | 363/67 |
| 2005/0146226 A1 * | 7/2005 | Trainer et al. | 307/73 |
| 2008/0007978 A1 * | 1/2008 | Han | 363/35 |
| 2008/0179951 A1 | 7/2008 | Brune et al. | |
| 2008/0205093 A1 | 8/2008 | Davies et al. | |
| 2009/0027934 A1 * | 1/2009 | Robledo Bustos | 363/126 |
| 2009/0085548 A1 | 4/2009 | Suh et al. | |
| 2009/0102436 A1 * | 4/2009 | Escobar Valderrama et al. | 323/207 |
| 2009/0206781 A1 | 8/2009 | Itoh et al. | |
| 2010/0067266 A1 * | 3/2010 | Dommaschk et al. | 363/64 |
| 2010/0118578 A1 | 5/2010 | Dommaschk et al. | |
| 2011/0018481 A1 * | 1/2011 | Hiller | 318/400.26 |
| 2012/0026767 A1 | 2/2012 | Inoue et al. | |
| 2012/0069610 A1 * | 3/2012 | Trainer et al. | 363/35 |
| 2012/0113699 A1 * | 5/2012 | Crookes et al. | 363/126 |
| 2012/0120697 A1 | 5/2012 | Cuk | |
| 2012/0127766 A1 * | 5/2012 | Crookes et al. | 363/126 |
| 2012/0170338 A1 * | 7/2012 | Trainer et al. | 363/127 |
| 2012/0182771 A1 * | 7/2012 | Trainer et al. | 363/51 |
| 2012/0188803 A1 * | 7/2012 | Trainer et al. | 363/37 |
| 2013/0128629 A1 * | 5/2013 | Clare et al. | 363/35 |
| 2013/0128636 A1 * | 5/2013 | Trainer et al. | 363/65 |
| 2013/0182467 A1 * | 7/2013 | Cross et al. | 363/35 |
| 2013/0194838 A1 | 8/2013 | Jang et al. | |
| 2013/0208514 A1 * | 8/2013 | Trainer et al. | 363/35 |
| 2013/0279211 A1 * | 10/2013 | Green et al. | 363/35 |

FOREIGN PATENT DOCUMENTS

| | | |
|---|---|---|
| WO | 2007023061 A2 | 3/2007 |
| WO | 2008024038 A1 | 2/2008 |
| WO | 2010088969 A1 | 8/2010 |
| WO | 2010112523 A1 | 10/2010 |
| WO | 2010145689 A1 | 12/2010 |
| WO | 2010145690 A1 | 12/2010 |
| WO | 2010149200 A1 | 12/2010 |
| WO | 2011012171 A1 | 2/2011 |
| WO | 2011098117 A1 | 8/2011 |
| WO | 2011113471 A1 | 9/2011 |
| WO | 2011124258 A1 | 10/2011 |
| WO | 2011127980 A1 | 10/2011 |
| WO | 2011157300 A1 | 12/2011 |
| WO | 2012013248 A1 | 2/2012 |

OTHER PUBLICATIONS

Office Action in U.S. Appl. No. 13/388,277, mailed on Jul. 3, 2014.
Office Action in U.S. Appl. No. 13/639,844, mailed on May 22, 2014.
Notice of Allowance in U.S. Appl. No. 13/640,468, mailed on Jun. 4, 2014.
Notice of Allowance in U.S. Appl. No. 13/813,414, mailed on Jun. 2, 2014.
Notice of Allowance in U.S. Appl. No. 13/378,336, mailed on Jun. 13, 2014.
First Chinese Office Action in Application No. 200980160700.4, mailed Jun. 25, 2014.

\* cited by examiner

HVDC CONVERTER WITH NEUTRAL-POINT CONNECTED ZERO-SEQUENCE DUMP RESISTOR

CROSS REFERENCE TO RELATED APPLICATIONS or PRIORITY CLAIM

This application is a national stage application under 35 U.S.C. §371 from PCT Application No. PCT/EP2010/062316, filed Aug. 24, 2010, entitled, "HVDC CONVERTER WITH NEUTRAL-POINT CONNECTED ZERO-SEQUENCE DUMP RESISTOR", the contents of which are incorporated herein by reference in its entirety.

This invention relates to a power electronic converter for use in high voltage direct current power transmission and reactive power compensation.

In power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC to DC power is also utilized in power transmission networks where it is necessary to interconnect AC networks operating at different frequencies.

In any such power transmission network, a converter 10 is required at each interface between AC and DC power to effect the required conversion, as shown in FIG. 1.

During AC to DC power conversion, the converter 10 imports power from the AC network 12 and exports power to the DC network 14, whereby the net power change within the converter 10 is typically zero. The occurrence of a fault on the DC side of the converter 10 may however lead to a sudden drop in power demand of the DC network 14 and thereby a reduction in power exported to the DC network 14. The converter however continues to import power from the AC network because the power generation source in the AC network 12, such as a wind driven generation plant, cannot be immediately shut down. This leads to a build up of excess real power in the converter 10 and this excess real power cannot be completely stored away within the DC link capacitor 16 or other capacitive components of the converter 10 due to their finite energy storage capabilities.

The presence of excess real power within the converter 10 may not only lead to overvoltage of the converter hardware components, but may also result in the speeding up of the electrical generators of the AC network 12, which leads to an increase in AC voltage frequency. Both scenarios may lead to damage of the converter hardware and the connected AC and DC networks 12, 14.

One solution to minimize the adverse effects of excess real power within the converter 10 is the use of additional hardware in the form of a series connection of a dump resistor 18 and IGBTs 20 connected in parallel with the DC link capacitor 16 of the converter 10, as shown in FIG. 2. During the rise in excess real power within the converter 10, the DC link capacitor 16 begins to absorb the excess real power. At this stage the IGBTs 20 are turned on to switch the dump resistor 18 into circuit, which results in a flow of current through the dump resistor 18 and thereby permits dissipation of the excess real power via the dump resistor 18.

Since the series connection of the dump resistor 18 and the IGBTs 20 are connected in parallel with the DC link capacitor 16, each of the dump resistor 18 and IGBTs 20 is required to have a voltage rating that matches or exceeds the full magnitude of the DC link voltage so as to ensure reliable operation of the converter 10. So as to obtain the required voltage rating, it may be necessary to increase the size and weight of the dump resistor 18 and/or the number of IGBTs 20, which leads to an overall increase in converter hardware size, weight and costs.

According to an aspect of the invention, there is provided a power electronic converter for use in high voltage direct current power transmission and reactive power compensation, the power electronic converter including three phase elements defining a star connection in which a first end of each phase element is connected to a common junction, the power electronic converter further including a converter unit including first and second DC terminals for connection in use to a DC network and three AC terminals, each AC terminal being connected in series with a second end of a respective phase element of the star connection, the converter unit including a plurality of switching elements controllable in use to facilitate power conversion between the AC and DC networks, the power electronic converter further including a third DC terminal connected between the first and second DC terminals, the third DC terminal being connected to the common junction of the star connection to define an auxiliary connection, the auxiliary connection including at least one dump resistor connected between the common junction and the third DC terminal, wherein the switching elements of the converter unit are controllable in use to modify a phase voltage at each AC terminal to include a triplen harmonic voltage component so as to dissipate real power in the or each dump resistor at a triplen harmonic frequency.

The arrangement of the dump resistor relative to the converter unit as outlined above allows the power electronic converter to remove excess real power by introducing a triplen harmonic voltage component into the phase voltage at each AC terminal. Since the voltage at the common junction of the star connection is equal to the average of the phase voltages, any non-triplen harmonic voltage components of the phase voltages are cancelled out at the common junction, which means that the voltage appearing at the common junction is equal in magnitude to the triplen harmonic voltage component. As such, a triplen harmonic voltage appears across the dump resistor, which allows the excess real power to be dissipated in the dump resistor at the corresponding triplen harmonic frequency.

Such use of the switching elements of the converter unit to initiate both power conversion and excess real power removal may simplify or eliminate the need for separate switching hardware in order to remove excess real power from the power electronic converter. This not only leads to reductions in converter hardware cost, size and weight but also simplifies the operating procedure and control scheme of the power electronic converter.

Additionally the or each dump resistor is only required to be rated for the magnitude of the triplen harmonic voltage component appearing at the common junction of the star connection, which leads to reductions in hardware size, weight and costs when compared to the conventional power electronic converter that requires the voltage rating of the dump resistor to match or exceed the full magnitude of the DC link voltage.

The provision of at least one dump resistor in an auxiliary connection of the power electronic converter therefore results in a more cost-efficient way of removing excess real power from power electronic converters having topologies capable of generating AC phase voltages having both fundamental and triplen harmonic components.

In embodiments of the invention, the switching elements of the converter unit may be controllable in use to modify the phase voltage at each AC terminal to simultaneously include a fundamental voltage component and a triplen harmonic voltage component.

The operation of the converter unit in this manner allows the excess real power removal procedure to be readily integrated into the power conversion process so as to enable continuous operation of the power electronic converter. Otherwise it may be necessary to interrupt the normal operation of the power electronic converter before initiating the excess real power removal procedure.

Preferably each triplen harmonic voltage component has the same magnitude.

The generation of a triplen harmonic voltage component of the same magnitude at each AC terminal allows a standard switching operation of the switching elements of the converter unit to be performed with respect to each AC terminal and thereby simplifies the control scheme of the power electronic converter.

The power electronic converter preferably further includes at least one DC link capacitor connected in series between the third DC terminal and each of the first and second DC terminals.

The inclusion of the DC link capacitors enables the power electronic converter to regulate the DC voltage presented to the DC network by minimising the presence of DC ripple.

In other embodiments, each phase element may include a transformer winding.

The star connection may define a secondary side of a transformer in which each transformer winding of the star connection is mutually coupled in use with a respective primary winding at a primary side of the transformer, each primary winding being connected to a respective phase of a three-phase AC network via line inductors. This enables each phase element to be operably associated in use with a respective phase of a three-phase AC network.

In further embodiments, the converter unit may further include three converter limbs, each converter limb including a respective one of the AC terminals, each converter limb defining first and second limb portions being respectively connected in series between the AC terminal and a respective one of the first and second DC terminals, each limb portion including a chain-link converter, each chain-link converter including a plurality of modules connected in series, each module including at least one primary switching element connected to at least one energy storage device, the or each primary switching element of each chain-link converter being operable in use so that the plurality of modules connected in series defines a stepped variable voltage source.

The structure of the chain-link converter allows the build-up of a combined voltage, which is higher than the voltage provided by an individual module, via the insertion of multiple modules, each providing a voltage, into the chain-link converter. By varying the value of the combined voltage, the chain-link converter may be operated to generate a voltage waveform of variable amplitude and phase angle. As such, the chain-link converter of each limb portion is capable of modifying the phase voltage of the respective phase element to include a triplen harmonic voltage component and/or a fundamental harmonic voltage component.

In embodiments employing the use of chain-link converters, each limb portion may further include at least one secondary switching element connected in series with the respective chain-link converter, the or each secondary switching element of each limb portion being controllable in use to switch the respective chain-link converter into or out of circuit.

The operation of the or each secondary switching element and the chain-link converter of each limb portion in this manner enables the power electronic converter to carry out rectification and inversion processes so as to facilitate power conversion between the AC and DC networks.

The series combination of one or more switching elements connected in series with a chain-link converter in each limb portion to switch the limb portion in and out of circuit between the respective DC terminal and the AC terminal is advantageous because it reduces the voltage range that each chain-link converter would be required to generate. This in turn allows the number of components in each chain-link converter to be minimized, and thereby results in savings in terms of size, weight and cost.

In other embodiments employing the use of chain-link converters, each module of each chain-link converter may include a set of series-connected primary switching elements connected in parallel with an energy storage device to define a 2-quadrant unipolar module that is capable of providing zero or positive voltage and can conduct current in two directions.

In further embodiments employing the use of chain-link converters, each module of each chain-link converter may include two sets of primary series-connected switching elements connected in parallel with an energy storage device to define a 4-quadrant unipolar module that is capable of providing negative, zero or positive voltage and can conduct current in two directions.

In embodiments employing the use of energy storage devices, the or each energy storage device of each module may be a capacitor, fuel cell, photovoltaic cell, battery or an auxiliary AC generator with an associated rectifier.

Each energy storage device may be any device that is capable of storing and releasing its electrical energy to provide a voltage. This flexibility is useful in designing converter stations in different locations where the availability of equipment may vary due to locality or transport difficulties. For example, on offshore wind farms, the energy storage device may be an auxiliary AC generator connected to a wind turbine.

In embodiments of the invention, each switching element may include at least one semiconductor device. In such embodiments, the or at least one semiconductor device may be an insulated gate bipolar transistor, a gate turn-off thyristor, a field effect transistor, an insulated gate commutated thyristor, an injection enhanced gate transistor or an integrated gate commutated thyristor.

In embodiments employing the use of at least one semiconductor device, each switching element may further include an anti-parallel diode connected in parallel with the respective semiconductor device.

The use of semiconductor devices is advantageous because such devices are small in size and weight and have relatively low power dissipation, which minimises the need for cooling equipment. It therefore leads to significant reductions in power converter cost, size and weight.

The fast switching capabilities of such semiconductor devices allow the power electronic converter to synthesize complex waveforms for injection into the AC side and/or DC side of the power electronic converter. The injection of such complex waveforms can be used, for example, to minimise the levels of harmonic distortion typically associated with line-commutated thyristor-based power electronic converters. Furthermore the inclusion of such semiconductor devices allows the power electronic converter to respond quickly to the increase in excess real power within the power electronic converter and thereby improves the reliability of the power electronic converter.

In other embodiments, the power electronic converter may further include three primary windings, wherein each phase element of the star connection is mutually coupled with a respective one of the primary windings, a first end of each primary winding is connected to a second end of a different primary winding such that the interconnection of the primary windings define a closed loop, and each junction between two primary windings is for connection in use to a respective phase of the three-phase AC network.

The arrangement of the primary windings in the above manner defines a delta connection. The lack of a neutral wire in the delta connection prevents the triplen harmonic currents from travelling into a neutral wire. This means that the triplen harmonic currents become trapped in the loop formed by the windings defining the delta connection and cannot enter the connected three-phase AC network. As such, the modification of each phase voltage to include a triplen harmonic voltage component has negligible effect on the connected three-phase AC network.

Preferred embodiments of the invention will now be described, by way of non-limiting examples, with to the accompanying drawings in which.

Figure 5A:
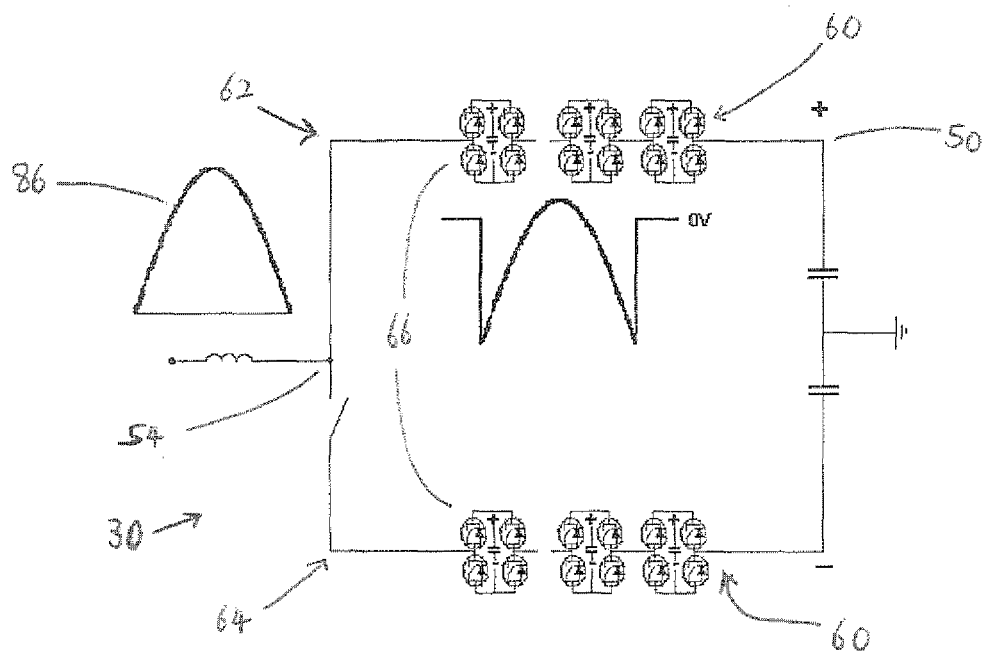
Figure 5B:
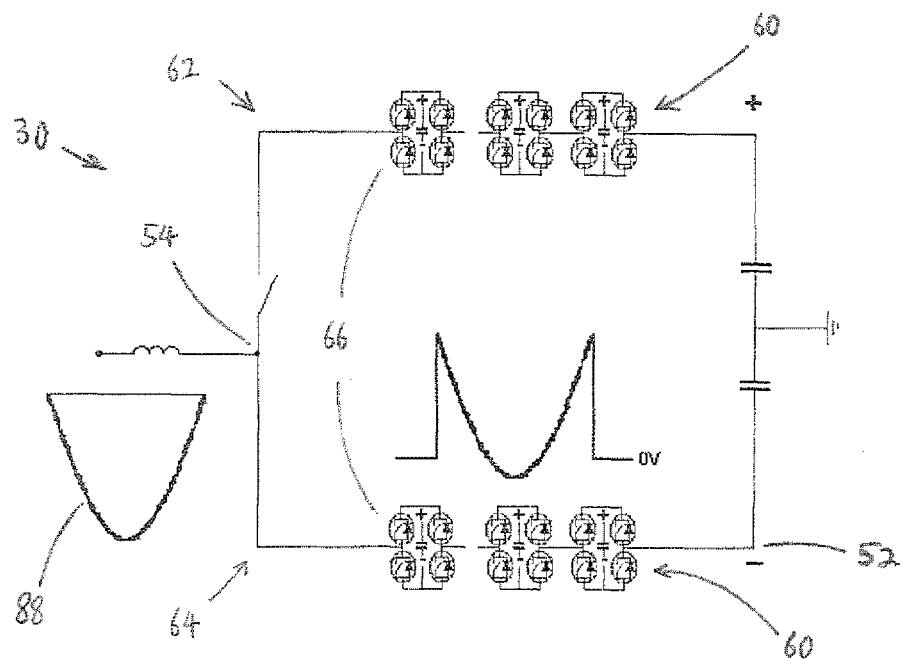
Figure 6:
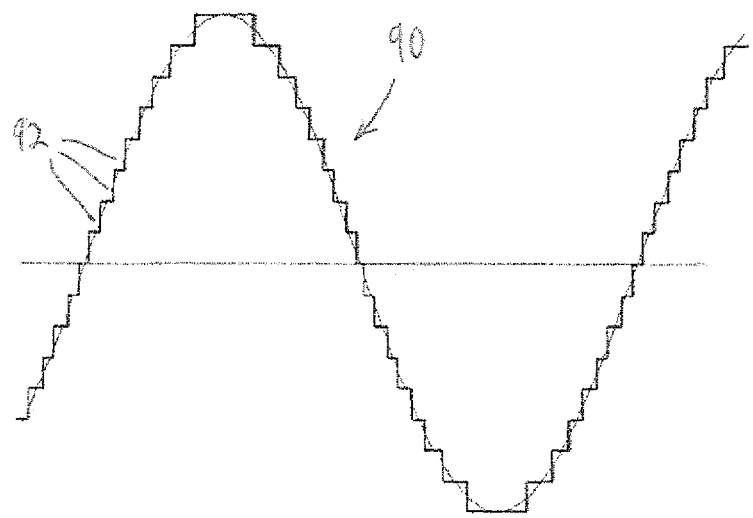
Figure 7:
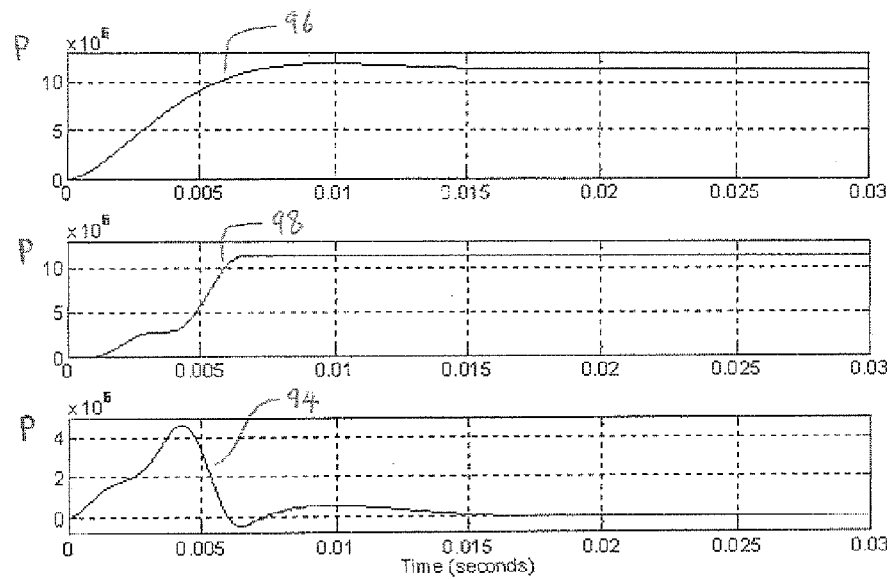
Figure 8:
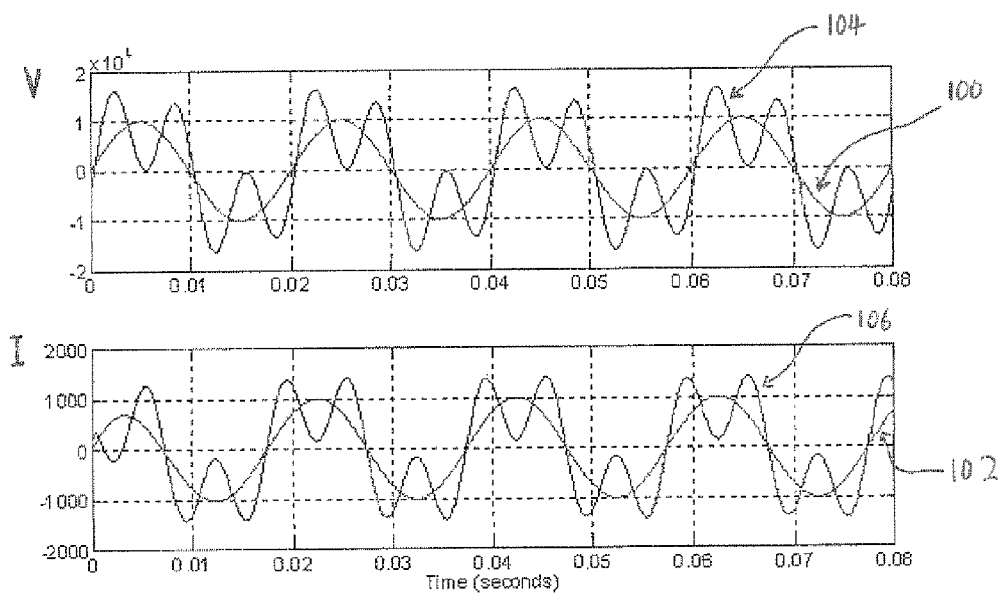

FIGS. 5a and 5b respectively show the generation of positive and negative half-cycles of an AC voltage waveform at the AC terminal of each converter limb;

FIG. 6 shows a step-wise approximation of an AC voltage waveform;

FIG. 7 shows the change in power within the power electronic converter during the excess real power removal procedure; and FIG. 8 illustrates the change in AC phase voltage and current during the introduction of a $3^{rd}$ harmonic component into the AC phase voltage and current.

Figure 1:
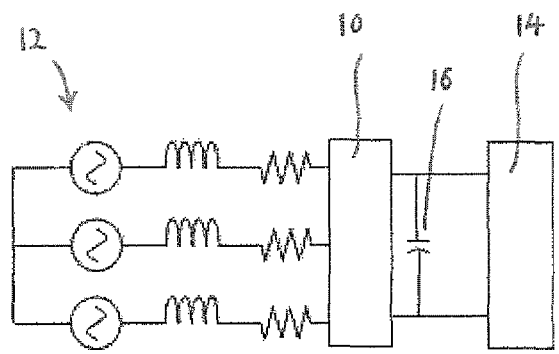
FIGS. 1 and 2 shows, in schematic form, prior art voltage source converters.
Figure 2:
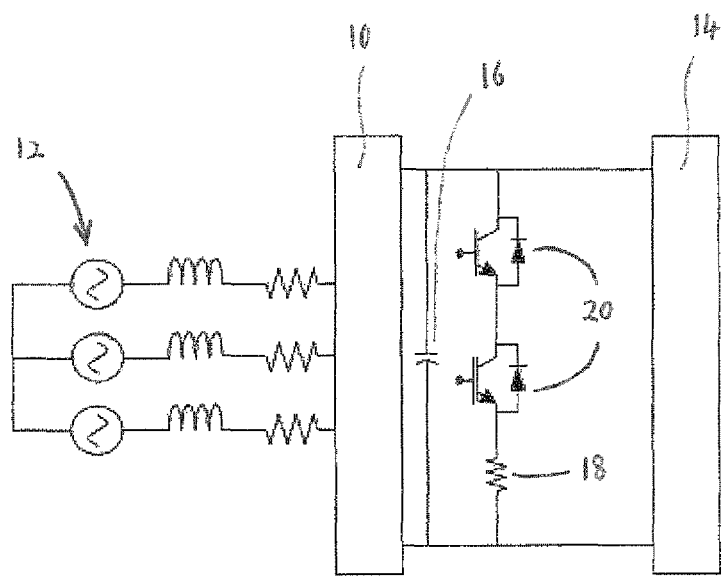
Figure 3:
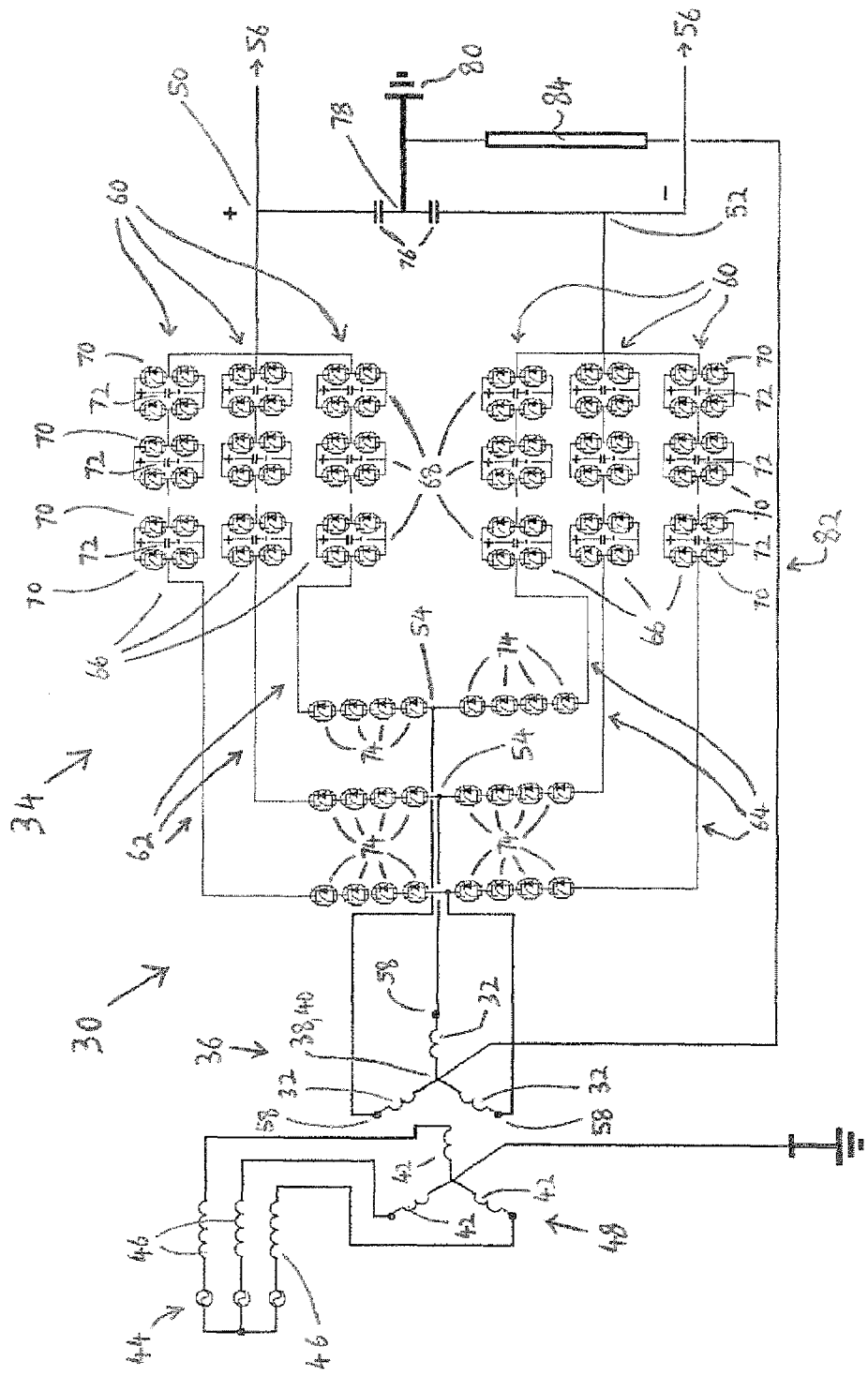
FIG. 3 shows a power electronic converter according to an embodiment of the invention.

A power electronic converter 30 according to an embodiment of the invention is shown in FIG. 3.

The power electronic converter 30 includes three phase elements 32 and a converter unit 34.

Each phase element 32 includes a transformer winding. The three phase elements 32 define a first star connection 36 in which a first end 38 of each phase element 32 is connected to a common junction of the first star connection 36. The first star connection 36 defines a secondary side of a transformer in which each transformer winding of the first star connection 36 is mutually coupled in use with a respective primary winding 42 at a primary side of the transformer, each primary winding being connected to a respective phase of a three-phase AC network 44 via a line inductor 46. This enables each phase element 32 to be operably associated in use with a respective phase of the three-phase AC network 44. The primary windings at the primary side of the transformer define a second star connection 48 in a similar manner to the first star connection 36 of the power electronic converter 30.

The converter unit 34 includes first and second DC terminals 50, 52 and three AC terminals 54.

The first and second DC terminals 50, 52 are respectively connected in use to positive and negative terminals of a DC network 56 while each AC terminal 54 is connected in series with a second end 58 of the respective phase element 32 of the first star connection 36.

The converter unit 34 further includes three converter limbs 60. Each converter limb 60 includes a respective one of the AC terminals 54, and first and second limb portions 62, 64. In each converter limb 60, the first limb portion 62 is connected in series between the AC terminal 54 and the first DC terminal 50 while the second limb portion 64 is connected in series between the AC terminal 54 and the second DC terminal 52.

Each limb portion 62, 64 includes a chain-link converter 66. Each chain-link converter 66 includes a plurality of modules 68 connected in series. The number of modules 68 in each chain-link converter depends on the required voltage rating of the respective limb portion 62, 64. Each module 68 of each chain-link converter 66 includes two pairs of primary switching elements 70 connected in parallel with a capacitor 72 to define a 4-quadrant bipolar module that can provide negative, zero or positive voltage and can conduct current in two directions.

Each limb portion 62, 64 further includes a plurality of series-connected secondary switching elements 74 connected in series with the respective chain-link converter 66. In other embodiments, each limb portion may include a single secondary switching element or any number of secondary series-connected switching elements, depending on the required voltage rating of each limb portion.

The series connection between the plurality of series-connected secondary switching elements 74 and the chain-link converter 66 of each of the first and second limb portions 62, 64 means that, in other embodiments, they may be connected in a reverse order between the AC terminal 54 and the respective DC terminal 50, 52.

Each of the primary and secondary switching elements 70, 74 includes an insulated gate bipolar transistor connected in parallel with an anti-parallel diode.

The power electronic converter 30 further includes a pair of DC link capacitors 76 and a third DC terminal 78. The pair of DC link capacitors 76 are connected in series between the first and second DC terminals 50, 52 and connected in parallel with each converter limb 66. A junction between the pair of DC link capacitors 76 defines the third DC terminal 78, which is connected to ground 80.

The third DC terminal 78 is connected to the common junction 40 of the first star connection 36 to define an auxiliary connection 82, which further includes a dump resistor 84 connected in series between the third DC terminal 78 and the common junction 40 of the first star connection 36.

It is envisaged that in other embodiments, the dump resistor may be replaced by a plurality of dump resistors connected in various configurations so as to provide a desired overall dump resistance.

It is also envisaged that in other embodiments, the third DC terminal 78 may not be connected directly to ground 80, the third DC terminal instead being connected to ground via the dump resistor 84.

The primary switching elements 70 of the modules 68 of each chain-link converter 66 are operable in use so that each chain-link converter 66 provides a stepped variable voltage source, and are switched at near to the fundamental frequency of the AC network 44.

The capacitor 72 of each module 68 may be bypassed or inserted into the respective chain-link converter 66 by changing the state of the primary switching elements 70.

The capacitor 72 of each module 68 is bypassed when the pairs of primary switching elements 70 are configured to form a short circuit in the module 68, causing the current in the power electronic converter 30 to pass through the short circuit and bypass the capacitor 72. This enables the module 68 to provide a zero voltage.

The capacitor 72 of each module 68 is inserted into the respective chain-link converter 66 when the pairs of primary switching elements 70 is configured to allow the converter current to flow into and out of the capacitor 72, which is then able to charge or to discharge its stored energy and provide a voltage. The bidirectional nature of the 4-quadrant bipolar module 68 means that the capacitor 72 may be inserted into the module 68 in either forward or reverse directions so as to provide a positive or negative voltage.

It is therefore possible to build up a combined voltage across the chain-link converter 66 which is higher than the voltage available from each individual module 68 via the insertion of the capacitors 72 of multiple modules 68, each providing its own voltage, into the chain-link converter 66.

The ability of a 4-quadrant bipolar module 68 to provide positive or negative voltages means that the voltage across each chain-link converter 66 may be built up from a combination of modules 68 providing positive or negative voltages. The energy levels in individual capacitors 72 may be maintained therefore at optimal levels by controlling the modules 68 to alternate between providing positive or negative voltage.

In other embodiments, it is envisaged each module of each chain-link converter may include a set of series-connected primary switching elements connected in parallel with the respective capacitor in a half-bridge arrangement to define a 2-quadrant unipolar module that can provide zero or positive voltage and can conduct current in two directions.

Figure 4:
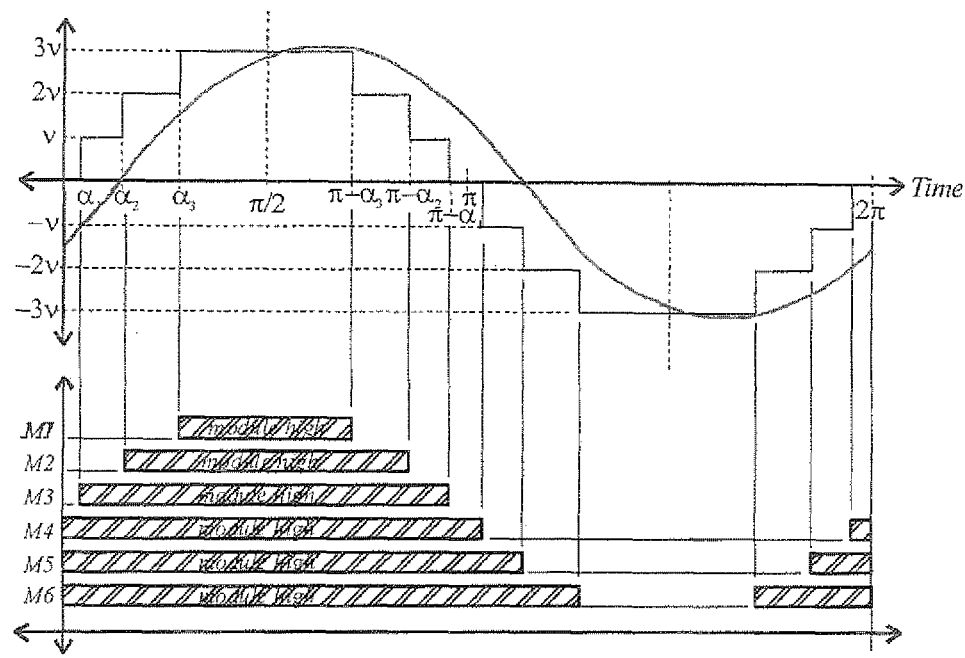
FIG. 4 shows a synthesis of a 50 Hz sinusoidal voltage waveform using a chain-link converter.

It is also possible to vary the timing of switching operations for each module 68 such that the insertion and/or bypass of the capacitors 72 of individual modules 68 in the chain-link converter 66 results in the generation of a voltage waveform. An example of a voltage waveform generated using the chain-link converters in FIG. 3 is shown in FIG. 4, in which the insertion of the capacitors of the individual modules is staggered to generate a 50 Hz sinusoidal waveform. Other waveform shapes may be generated by adjusting the timing of switching operations for each module 68 in the chain-link converter 66.

It is envisaged that in other embodiments each switching element may include a different semiconductor device, such as a gate-turn-off thyristor, a field effect transistor, an insulated gate commutated thyristor, an injection enhanced gate transistor, an integrated gate commutated transistor or other forced commutated or self commutated semiconductor switches, preferably connected in parallel with an anti-parallel diode.

The fast switching capabilities of such semiconductor devices allow the power electronic converter 30 to synthesize complex waveforms for injection into the AC side and/or DC side of the power electronic converter 30. The injection of such complex waveforms can be used, for example, to minimise the levels of harmonic distortion typically associated with line-commutated thyristor-based voltage source converters.

It is also envisaged that in other embodiments, the capacitor of each module may be replaced by a different energy storage device such as a fuel cell, a battery, a photovoltaic cell or an auxiliary AC generator with an associated rectifier.

In use, the secondary switching elements 74 of the first and second limb portions 62, 64 are operable to switch each of the chain-link converters 66 in and out of circuit between the respective DC terminal 50, 52 and the AC terminal 54. When switched into circuit, each chain-link converter 66 is operable in use to generate a voltage waveform at the respective AC terminal 54 to facilitate power conversion between the AC and DC networks 44, 56.

FIGS. 5a and 5b shows the operation of the power electronic converter 30 in FIG. 3 to generate positive and negative half-cycles of an AC voltage waveform at the AC terminal 54 of each converter limb 60.

To generate the positive half-cycle of the AC voltage waveform using a converter limb 60, the first limb portion 62 is switched into circuit while the second limb portion 64 is switched out of circuit and the chain-link converter 66 of the first limb portion 62 is controlled to vary its voltage to offset the voltage at the first DC terminal 50 so as to synthesize a positive half-sine wave 86 at the AC terminal 54, as shown in FIG. 5a.

To generate the negative half-cycle of the AC voltage waveform using a converter limb 60, the first limb portion 62 is switched out of circuit while the second limb portion 64 is switched into circuit and the chain-link converter 66 of the second limb portion is controlled to vary its voltage to offset the voltage at the second DC terminal 52 so as to synthesize a negative half-sine wave 88 at the AC terminal 54, as shown in FIG. 5b.

Referring back to FIG. 3, the operation of the first and second limb portions 62,64 of each converter limb 60 in this manner leads to the generation of an AC phase voltage at the AC terminal 54 of each converter limb 60 and thereby permits connection to the three-phase AC network 44. The switching of the chain-link converters 66 at near the fundamental frequency of the AC network 44 results in the generation of a fundamental AC voltage waveform at each AC terminal 54.

The chain-link converters are preferably operable to generate a sinusoidal voltage waveform 90 using a step-wise approximation, as shown in FIG. 6. The chain-link converters are suitable for use in step-wise waveform generation due to their ability to provide voltage steps 92 to increase or decrease the output voltage at the respective AC terminal. The step-wise approximation of the voltage waveform 90 may be improved by using a higher number of modules with lower voltage levels to increase the number of voltage steps 92.

In the first star connection 36, the voltage at its common junction 40 is equal to the average of the phase voltages. Since each phase voltage only includes a fundamental AC voltage component, these fundamental AC voltage components are cancelled out at the common junction 40, which results in zero voltage appearing at the common junction 40 of the first star connection 36. The voltage across the dump resistor 84 is equal to the voltage difference between the common junction 40 of the first star connection 36 and the grounded third DC terminal 78. The voltage across the dump resistor 84 is therefore equal to zero voltage, which results in zero current flowing through the dump resistor 84 and zero power dissipation in the dump resistor 84.

In the event of a fault in the DC network resulting in excess real power within the power electronic converter 30, the chain-link converter 66 of each limb portion 62,64 is controllable in use to vary its voltage so as to generate an AC phase voltage at the respective AC terminal 54 including a fundamental voltage component and a zero-phase sequence, triplen harmonic voltage component, the triplen harmonic voltage component of the AC phase voltage at each AC terminal 54 having the same magnitude. The generation of each AC phase voltage including both fundamental and triplen harmonic voltage components is made possible by the ability of each chain-link converter 66 to synthesize complex voltage waveforms.

Preferably the triplen harmonic voltage component is a $3^{rd}$, $9^{th}$ or $15^{th}$ harmonic voltage component so as to permit the power electronic converter 30 to accurately follow complex voltage waveforms.

As outlined earlier, the fundamental AC voltage components of the phase voltages are cancelled out at the common junction 40 of the first star connection 36. The triplen harmonic voltage components are however not cancelled out at the common junction 40 as a result of their zero-phase sequence nature. This results in a voltage appearing at the common junction 40 of the first star connection 36, the voltage being equal in magnitude to the triplen harmonic voltage component.

As such, the voltage across the dump resistor 84 is equal in magnitude to the triplen harmonic voltage component, which results in a flow of current through the dump resistor 84 and power dissipation in the dump resistor 84 at the corresponding triplen harmonic frequency.

The rate of power dissipation in the dump resistor 84 may vary depending on the resistance value of the dump resistor 84. Preferably the resistance of the dump resistor 84 is sufficiently high to dissipate power so as to reduce the amount of excess real power within the power electronic converter 30 that is continuously importing power from the AC network 44.

FIG. 7 shows the change in power within the power electronic converter during the excess real power removal procedure. There is negligible difference 94 between the power 96 imported from the AC network at a fundamental frequency of 50 Hz and the power 98 dissipated in the dump resistor at a triplen harmonic frequency of 150 Hz. As such, it is possible to completely dissipate the excess real power imported by the power electronic converter 30 from the AC network.

As such, excess real power may be continuously removed from the power electronic converter 30 of FIG. 3 via power dissipation in the dump resistor 84 at a triplen harmonic frequency until the or each power generation source in the AC network 44 is shut down to stop the transfer of power from the AC network 44 to the power electronic converter 30.

The excess real power removal procedure may also be initiated by adding a controlled amount of zero-phase sequence triplen harmonics to the power electronic converter voltage tracking signal so as to control the DC voltage on the DC side of the power electronic converter 30.

The ability of the chain-link converters 66 to simultaneously generate both fundamental and triplen harmonic voltage components allows the excess real power removal procedure to be readily integrated into the power conversion process so as to enable continuous operation of the power electronic converter 30. Otherwise it may be necessary to interrupt the normal operation of the power electronic converter 30 before initiating the excess real power removal procedure.

The use of insulated gate bipolar transistors in the switching elements 70, 74 of each converter limb 60 allows the power electronic converter to respond quickly to the increase in excess real power within the power electronic converter 30 and thereby improves the reliability of the power electronic converter 30. Additionally the fast switching characteristics of the insulated gate bipolar transistors also allows the power electronic converter 30 to seamlessly switch between the generation of phase voltages including only fundamental voltage waveforms and the generation of phase voltages including both fundamental and triplen harmonic voltage components.

Such use of the switching elements 70, 74 of the converter limbs 60 to initiate both power conversion and excess real power removal may simplify or eliminate the need for separate switching hardware in order to remove excess real power from the power electronic converter 30. This not only leads to reductions in converter hardware cost, size and weight but also simplifies the operating procedure and control scheme of the power electronic converter 30.

In addition the dump resistor 84 is only required to be rated for the magnitude of the triplen harmonic voltage component appearing at the common junction 40 of the first star connection 36, which leads to reductions in hardware size, weight and costs when compared to the conventional power electronic converter which requires the voltage rating of the dump resistor to match or exceed the full magnitude of the DC link voltage.

The provision of the dump resistor 84 in an auxiliary connection 82 of the power electronic converter 30 therefore results in a more cost-efficient way of removing excess real power from the power electronic converter 30.

It is envisaged that in other embodiments, the converter unit of the power electronic converter may have a different topology having three AC phase terminals and being capable of generating AC phase voltages having both fundamental and triplen harmonic components, which allows the removal of excess real power when the converter unit is used in conjunction with the aforementioned first star connection and auxiliary connection.

It can be seen from FIG. 8 that the introduction of a $3^{rd}$ harmonic component into an AC phase voltage and current 100,102 results in a distorted AC phase voltage and current 104,106 when compared to the original shape of the AC phase voltage and current 100,102 that includes only a fundamental AC component. The introduction of the $3^{rd}$ harmonic voltage component also affects the peak magnitude of the converter and transformer current.

Appropriate values of dump resistance and peak magnitude and phase (relative to the fundamental frequency of the AC network) of the triplen harmonic voltage may be selected so as to reduce distortion of the AC phase voltage and current and thereby optimise operation of the power electronic converter. This ensures that excess real power can be removed from the power electronic converter via power dissipation in the dump resistor at a triplen harmonic frequency without having to increase the rating of the associated plant.

In other embodiments, it is envisaged that the power electronic converter may further include three primary windings, wherein each phase element of the first star connection is mutually coupled with a respective one of the primary windings, a first end of each primary winding is connected to a second end of a different primary winding such that the interconnection of the primary windings define a closed loop, and each junction between two primary windings is for connection in use to a respective phase of the three-phase AC network.

The arrangement of the primary windings in the above manner defines a delta connection. The lack of a neutral wire in the delta connection prevents the triplen harmonic currents from travelling into a neutral wire. This means that the triplen harmonic currents become trapped in the loop formed by the windings defining the delta connection and cannot enter the connected three-phase AC network. As such, the modification of each phase voltage to include a triplen harmonic voltage component has negligible effect on the connected three-phase AC network.

The invention claimed is:

1. A power electronic converter (30) for use in high voltage direct current power transmission and reactive power compensation, the power electronic converter (30) including three phase elements (32) defining a star connection in which a first end (38) of each phase element is connected to a common junction (40), the power electronic converter (30) further including a converter unit (34) including first and second DC terminals (50, 52) for connection in use to a DC network (56) and three AC terminals (54), each AC terminal (54) being connected in series with a second end (58) of a respective phase element (32) of the star connection (36), the converter unit including a plurality of switching elements (70, 74) controllable in use to facilitate power conversion between the AC and DC networks (44, 56), the power electronic converter further including a third DC terminal (78) connected between the first and second DC terminals (50, 52), the third DC terminal (78) being connected to the common junction (40) of the star connection (36) to define an auxiliary connection (82), the auxiliary connection including at least one dump resistor (84) connected between the common junction (40) and the third DC terminal (78), wherein the switching elements (70, 74) of the converter unit (34) are controllable in use to modify a phase voltage at each AC terminal to include a triplen harmonic voltage component so as to dissipate real power in the or each dump resistor at a triplen harmonic frequency.

2. A power electronic converter (30) according to claim 1 wherein the switching elements of the converter unit are controllable in use to modify the phase voltage at each AC terminal to simultaneously include a fundamental voltage component and a triplen harmonic voltage component.

3. A power electronic converter (30) according to claim 1 wherein each triplen harmonic voltage component has the same magnitude.

4. A power electronic converter (30) according to claim 1 further including at least one DC link capacitor (16) connected in series between the third DC terminal and each of the first and second DC terminals.

5. A power electronic converter (30) according to claim 1 wherein each phase element includes a transformer winding.

6. A power electronic converter (30) according to claim 1 wherein the converter unit further includes three converter limbs (60), each converter limb including a respective one of the AC terminals, each converter limb defining first and second limb portions (62, 64) being respectively connected in series between the AC terminal and a respective one of the first and second DC terminals, each limb portion including a chain-link converter (66), each chain-link converter (66) including a plurality of modules connected in series, each module including at least one primary switching element (70) connected to at least one energy storage device, the or each primary switching element (70) of each chain-link converter being operable in use so that the plurality of modules connected in series defines a stepped variable voltage source.

7. A power electronic converter (30) according to claim 6 wherein each limb portion further includes at least one secondary switching element (74) connected in series with the respective chain-link converter, the or each secondary switching element (74) of each limb portion being controllable in use to switch the respective chain-link converter into or out of circuit.

8. A power electronic converter (30) according to claim 6 wherein each module of each chain-link converter (66) includes a set of series-connected primary switching elements connected in parallel with an energy storage device to define a 2-quadrant unipolar module that is capable of providing zero or positive voltage and can conduct current in two directions.

9. A power electronic converter (30) according to claim 6 wherein each module of each chain-link converter (66) includes two sets of primary series-connected switching elements connected in parallel with an energy storage device to define a 4-quadrant unipolar module that is capable of providing negative, zero or positive voltage and can conduct current in two directions.

10. A power electronic converter (30) according to claim 6 wherein the or each energy storage device of each module is a capacitor, fuel cell, photovoltaic cell, battery or an auxiliary AC generator with an associated rectifier.

11. A power electronic converter (30) according to claim 1 wherein each switching element includes at least one semiconductor device.

12. A power electronic converter (30) according to claim 11 wherein the or at least one semiconductor device is an insulated gate bipolar transistor, a gate turn-off thyristor, a field effect transistor, an insulated gate commutated thyristor, an injection enhanced gate transistor or an integrated gate commutated thyristor.

13. A power electronic converter (30) according to claim 11 wherein each switching element further includes an anti-parallel diode connected in parallel with the respective semiconductor device.

14. A power electronic converter (30) according to claim 1 further including three primary windings, wherein each phase element of the star connection is mutually coupled with a respective one of the primary windings, a first end of each primary winding is connected to a second end of a different primary winding such that the interconnection of the primary windings define a closed loop, and each junction between two primary windings is for connection in use to a respective phase of the three-phase AC network.

* * * * *